United States Patent
Lill

[15] 3,665,657
[45] May 30, 1972

[54] APPARATUS FOR MOUNTING DISC BRAKE ROTORS DURING TRUING

[72] Inventor: Melvin H. Lill, Okemos, Mich.
[73] Assignee: FMC Corporation, San Jose, Calif.
[22] Filed: July 22, 1970
[21] Appl. No.: 57,260

[52] U.S. Cl.............................................51/236, 269/48.1
[51] Int. Cl.......................................................B24b 41/06
[58] Field of Search..................51/227, 236, 237; 269/48.1, 269/52; 29/116, 117

[56] References Cited

UNITED STATES PATENTS

| | | | |
|---|---|---|---|
| 2,644,497 | 7/1953 | Wilmer | 269/52 |
| 1,854,618 | 4/1932 | McGrady | 51/237 |
| 2,413,678 | 1/1947 | Beverlin | 51/237 |
| 1,143,950 | 6/1915 | Domiji | 51/237 UX |
| 1,781,721 | 11/1930 | Earl | 51/227 UX |
| 2,767,676 | 10/1956 | Johnson | 269/48.1 |
| 2,763,464 | 9/1956 | Leonhardt | 254/29 |

*Primary Examiner*—Harold D. Whitehead
*Attorney*—F. W. Anderson, C. E. Tripp and J. F. Verhoeven

[57] ABSTRACT

The mounting of a wheel hub on an arbor during truing of the disc brake rotor faces of the hub is accomplished with the aid of two special adapters. Each adapter has two contractible beveled crowned heads of different diameter to accommodate different size rotors. During truing, each end of the wheel hub is supported by the engagement of one crowned head of the adapter with the bearing cup in that end of the rotor. The adapters, which are contractible, are pressed into engagement with the arbor to take up all clearance between the arbor and the wheel hub.

4 Claims, 3 Drawing Figures

Patented May 30, 1972
3,665,657
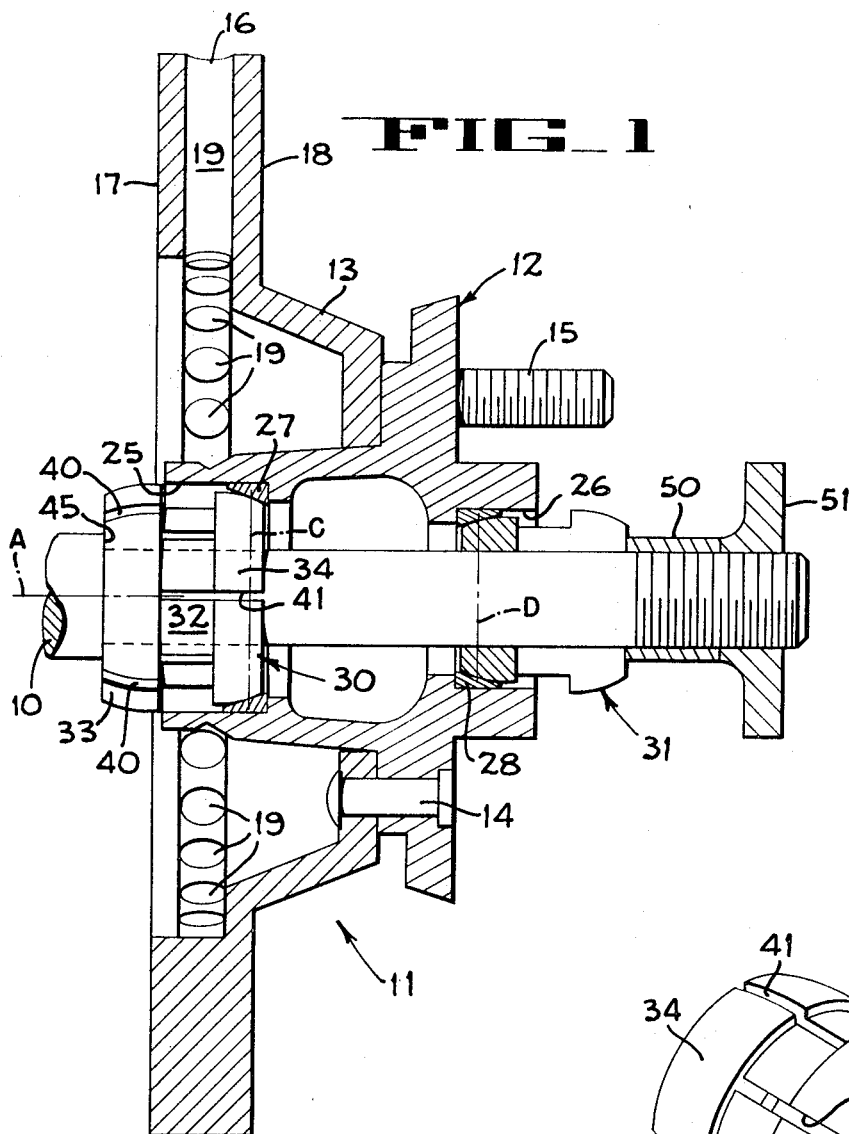
FIG_1
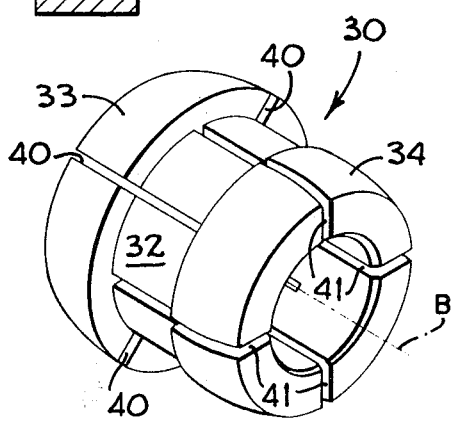
FIG_2
FIG_3
INVENTOR.
MELVIN H. LILL
BY C.E. Tripp
J.F. Verhoeven
ATTORNEYS

APPARATUS FOR MOUNTING DISC BRAKE ROTORS DURING TRUING

BACKGROUND OF THE INVENTION

A typical disc brake rotor may, for example, be a part of a vehicle wheel hub which has spaced apart bearing cups mounted in bores at opposite ends of the hubs. When the hub is mounted in the vehicle, the bearing cups seat on the wheel bearings of the vehicle.

It is important, for optimum braking, that the opposite radial faces of the rotor be normal to the axis of the vehicle wheel bearings. In other words, a central rotor axis normal to the radial faces of the rotor should, when mounted in the vehicle, be coincident with, or at least parallel to, the axis of the wheel bearings. The difficult of attaining the required squareness of the rotor faces to the wheel bearing axis will be appreciated when the geometry of the disc brake rotor, and the wheel hub of which it is a part, is considered. The outer diameter of the rotor, which may, for example, be 12 inches, may be on the order of five times greater than the span between the centers of the hub bearing cups. A typical maximum recommended runout at the outer edge of the radial face would be on the order of 0.002 inches, which means that the maximum deviation of the rotor axis from parallelism with the wheel bearing axis is one-fifth that amount, or 0.0004 inches (that is, 0.0002 inches at each bearing cup).

One factor contributing to the difficulty of achieving squareness of the radial rotor faces with the axis of the wheel bearing is that, due to manufacturing tolerances, the two bearing cups are not usually mounted in the wheel hub in exact coaxial relationship. This manufacturing error, which would be too costly for the manufacturer to avoid, is rectified by the manufacturer by mounting the rotor on a precision arbor having inclined surfaces matching the inclined surfaces of the bearing cups of the wheel hub. When the cup surfaces are seated on the arbor surfaces, the rotor is oriented relative to the arbor surfaces in the same manner the rotor will be oriented relative to the wheel bearings in the vehicle. Thus, when the rotor surfaces of a rotor mounted on the manufacturer's precision arbor are finished by grinding, the faces will be square with the wheel bearing axis after installation in a vehicle.

In subsequent truing operations performed in repair and maintenance facilities, precision arbors cannot, as a practical matter, be supplied for every vehicle which may need brake rotor truing. The disc brake rotors and bearing cups are of different sizes, and the bearing cups often have surfaces inclined at slightly different angles. Rotors are conventionally mounted clamped between adapters which bear against the ends of the bearing cups in the rotor. Not only does the lack of axial alignment of the bearing cups make positioning the rotor on the arbor difficult, but also the clearance between the adapters and the arbor, which is necessary to get the adapters on the arbor, further complicates the problem. With clearance at each adapter, it is impossible to true the radial faces within the acceptable limits with any degree of certainty.

SUMMARY OF THE INVENTION

The apparatus for mounting the disc brake rotor during truing of the present invention offers the advantages of truing the rotor faces so they will be square to the wheel bearing axis with a method and with apparatus which can be used on brake rotors of more than one size and on brake rotors with bearing cup surfaces of slightly different inclination. By eliminating the clearance in mounting the wheel hub, rotor faces can be trued square within desired limits and without expensive, special arbors.

In brief, a grinding machine, such as the one shown in the patent U.S. Pat. No. 3,500,589 of W. B. Ellege, issued Mar. 17, 1970, has a rotatable arbor which receives the disc brake rotor for rotation during truing. The wheel hub of which the rotor is a part has bearing cups received in bores at each end. The wheel hub is mounted on two adapters received on the arbor, and the adapters are engaged, respectively, with the two bearing cups of the wheel hub. Each adapter, which is in the form of a sleeve, has two heads, one at each end. The heads are of different size to accommodate different size brake rotors, and each head has an arcuate crown surface to engage the bearing cup inclined surface intermediate the ends of the bearing cup. With two arcuate crowned head, the adapter can accommodate bearing cups with surfaces inclined at slightly different angles, and can accommodate wheel hubs with different size bearing cups.

The adapter sleeve has two sets of slots, one set extending inwardly through one head and the other set extending inwardly through the other head. The two sets of slots are staggered with respect to each other. Each set of slots divides one of the heads into segments which, when urged against the inclined surface of a bearing cup, are pressed against the arbor to eliminate the clearance therebetween. Thus, when the adapters are clamped between, for example, a shoulder and a sleeve by a clamp nut, the adapters will contract on the arbor by virtue of the camming action of the bearing cups to be held in concentric relation to the arbor without clearance therebetween. At the same time, the arcuate adapter heads firmly press against the bearing cups to hold the bearing cups concentric to the arbor. Thus, the wheel hub is held on the adapters in the same orientation as the hub will be held on the wheel bearings so that when the faces are trued square to the axis of rotation of the arbor, the faces will be square to the axis of the wheel bearings when mounted in the vehicle.

It is therefore one object of the present invention to provide an apparatus for, mounting a disc brake rotor in a grinder during truing operations in the same orientation as when the rotor is mounted on the wheel bearings of a vehicle.

It is another object of the present invention to provide an apparatus for, holding a disc brake rotor concentrically on an arbor during truing operations.

It is still another object of the present invention to provide adapters for mounting disc brake rotors of different size on an arbor during truing.

It is yet another object of the present invention to provide adapters for mounting a workpiece, such as a disc brake rotor, on an arbor wherein the adapters are deflected by the workpiece to take up clearance between the adapters and the arbor.

BRIEF DESCRIPTION OF THE DRAWINGS

FIG. 1 is a side view in cross section of a wheel hub of which a disc brake rotor is a part mounted on the arbor of a disc brake grinding machine in accordance with the teaching of the present invention.

FIG. 2 is a view in perspective, of one end of the adapter used to mount the disc brake rotor on the arbor.

FIG. 3 is a view in perspective of the other end of the adapter shown in FIG. 2.

DESCRIPTION OF THE PREFERRED EMBODIMENT

There is shown in FIG. 1 the arbor 10 of a disc brake grinder which may, for example, be a lathe of the type shown in U.S. Pat. No. 2,663,975 or U.S. Pat. No. 3,500,589 with a grinding device mounted thereon as shown in the latter of said patents.

A vehicle wheel hub 11, which is shown on the arbor 10 in FIG. 1, comprises a bearing hub 12 and a brake rotor 13. The bearing hub and brake rotor are secured together by rivets 14. The bearing hub has wheel bolts 15 to receive the vehicle wheel. The brake rotor has a flange 16 with flat annular surfaces 17, 18, respectively, on opposite sides of the flange. The flange has radial passages 19 therein to facilitate cooling. The surfaces 17, 18, when the rotor is mounted in a vehicle, are engaged by brake linings mounted in the vehicle on each side of the flange. The surfaces 17, 18, which should be smooth for optimum braking, become rough, and sometimes grooved, through use. To restore the brakes, the surfaces 17 and 18 are first turned and then ground to a smooth finish as the arbor 10 rotates the rotor as described more fully in U.S. Pat. No. 3,500,589. This work is generally done in garages or other vehicle maintenance service facilities.

The bearing hub 12 has a first bore 25 extending into one end of the hub 12 and a second bore 26 extending into the opposite end of the hub 12. A first bearing cup 27 is press fitted into the first bore 25 and a second bearing cup 28 is press fitted into the second bore 26. The bearing cups seat on the vehicle wheel bearings when the wheel hub is mounted on the vehicle.

Optimum braking of the vehicle is achieved when the faces 17, 18 are square, when mounted in the vehicle, to the axis of the wheel bearings. It is important, for grinding faces 17, 18 which will be square, or normal, to the axis of the wheel bearings, that the wheel hub be mounted on arbor 10 with the faces 17, 18 normal to the axis of rotation A of the arbor. This has been accomplished by the use of special adapters 30, 31.

As shown in FIGS. 2 and 3, adapter 30 comprises a sleeve 32 having a first head 33 of circular cross section at one end of the sleeve and a second head 34 of circular cross section at the opposite end of the sleeve. Head 33 is larger than head 34. Both heads are beveled, tapering downwardly and outwardly from the inner edge of the head, and both, when viewed from the side (see FIG. 1), are of arcuate conformation to form a crown. The adapter 30 has a first set of slots 40, parallel to the central axis B of the sleeve, which begin at the outer edge of head 33 and terminate within the sleeve at the inner end of head 34. A second set of slots 41, parallel to the first set of slots 40 and staggered with respect thereto, extend inwardly from the outer edge of head 34 and terminate within the sleeve at the inner end of head 33. It should be noted that each set of slots divides a head into circumferential segments which can be slightly depressed to contract the inner diameter of the head.

To mount the wheel hub 11 on the rotor 10, the first adapter 30 is placed on the arbor against the shoulder 45 thereon. The wheel hub is then placed over the arbor with the bearing cup 27 seated on head 34 of the adapter. It will be noted that the bearing cup will contact the head 34 along circle C. The position of the circle of contact will often differ for different bearing cups but, with the proper adapter and the appropriate head of the adapter, contact will be made between the ends of the head. Although the angle of inclination of the bearing cups for different vehicles are generally approximately the same, they will differ frequently within 1° or 2°. The beveled, arcuate head 33 of the adapter 30, however, will accommodate bearing cups having slightly different angles of inclination and of slightly different size without difficulty.

The adapter 31 is then placed on the arbor with one of the heads engaged with the bearing cup 28 on a circle D. It will be noted that there is clearance between each adapter, when in the relaxed condition, and the arbor 10 so that the adapters can be freely placed over the arbor without binding. The adapters 30, 31, and the wheel hub 11, are urged together, between shoulder 45 and a sleeve 50, by a nut 51. The wheel hub, which constitutes a workpiece to be machined, will cam the segmental heads of the adapters into engagement with the arbor to eliminate the clearance between the heads and the arbor. Thus, the wheel hub is supported, without clearance, on the adapters and the adapters are supported, without clearance, on the arbor. The bearing cups and hub are thus held on the adapters in the same orientation as the bearing cups and hub will be held on the wheel bearings. Therefore, when the radial disc brake rotor faces 17, 18 are trued square to the axis of rotation of the arbor in the grinding machine, the faces will be square to the axis of the wheel bearings after being mounted in the vehicle.

As shown in FIG. 1, only the smaller head 34 of adapter 30 and the smaller head of adapter 31 are used to mount the wheel hub 11. If the wheel hub had larger wheel bearings than the wheel bearings 27, 28, the same adapters 30, 31 could be utilized. The adapters would be reversed on the arbor to use the large heads. Thus, each set of arbors can accommodate wheel hubs with two different sized bearing cups, and only half the adapters which might be expected to be needed are required to service the different size bearing cups that are encountered.

Although the best mode contemplated for carrying out the present invention has been herein shown and described, it will be apparent that modification and variation may be made without departing from what is regarded to be the subject matter of the invention.

What is claimed is:

1. An adapter for selectively supporting different size internally bored work members on a rotating arbor without clearance comprising a sleeve, a first annular beveled contractible head of a first diameter larger than said sleeve on one end of the sleeve to engage a member of one size, and a second beveled contractible head on the other end of the sleeve and of a different size larger than said second diameter to engage an internally bored member of another size, said first and said second heads and a portion of the sleeve extending therebetween each having a plurality of radial slots therethrough which extend to and terminate at the adjacent surface of the other head to provide an integral sleeve with independently contractible heads of different sizes on both ends.

2. An adapter for selectively supporting members having internal bores of different sizes on an arbor without clearance comprising a tubular sleeve, a first beveled head of circular cross section on the sleeve and being larger in diameter than said sleeve, said first head having an arcuate crown of a diameter larger than the diameter of said sleeve to engage one size bore in the member, a second beveled head of circular cross section on the sleeve, said second head being larger in diameter than the first head and having an arcuate crown of a diameter larger than the diameter of said sleeve to engage a bore of another size in said member, said first and second heads and a portion of the sleeve extending therebetween each having a plurality of radial slots therethrough which extend to and terminate at the adjacent surface of the other head to provide an integral sleeve with independently contractible heads of different sizes at both ends.

3. An apparatus for selectively supporting work members each having internal bores of different sizes on each end on an arbor without clearance comprising a first tubular adapter sleeve, a first beveled head of circular cross section on the sleeve and having a first diameter larger than that of said sleeve, a second beveled head of circular cross section on the sleeve, said second beveled head being of a second diameter larger than said first beveled head, a first set of radial slots terminating in the sleeve and extending through said first head to segment the head for contraction, a second set of radial slots terminating in the sleeve and extending through said second head to segment the second head for contraction, said second set of slots being staggered relative to said first set of slots, a second tubular adapter sleeve, a third beveled head of circular cross section on said second sleeve and having a third diameter larger than said second diameter, a fourth beveled head of circular cross section on the sleeve, said fourth beveled head being of a fourth diameter different than any of said other diameters and larger than the diameter of said second sleeve, a third set of radial slots terminating in said second sleeve and extending through said third head to segment the third head for contraction, a fourth set of radial slots terminating in said second sleeve and extending through said fourth head to segment the fourth head for contraction, said fourth set of slots being staggered relative to said third set of slots, and means for urging said first and second tubular adapter sleeves toward each other causing one of the preselected heads on each of said adapter sleeves to engage an associated one of said bores in the work member with sufficient force to contract said preselected heads into gripping engagement between the work member and the arbor without clearance.

4. The apparatus of claim 3 in which the first, second, third and fourth beveled heads have arcuate crowns.

* * * * *

UNITED STATES PATENT OFFICE
CERTIFICATE OF CORRECTION

Patent No. 3,665,657          Dated  May 30, 1972

Inventor(s)  MELVIN H. LILL

It is certified that error appears in the above-identified patent and that said Letters Patent are hereby corrected as shown below:

Column 4, line 17; change "second" to --first--.

Signed and sealed this 9th day of January 1973.

(SEAL)
Attest:

EDWARD M. FLETCHER, JR.                ROBERT GOTTSCHALK
Attesting Officer                      Commissioner of Patents